United States Patent
Badger, II

(10) Patent No.: US 9,809,167 B1
(45) Date of Patent: Nov. 7, 2017

(54) STOPPED VEHICLE TRAFFIC RESUMPTION ALERT

(71) Applicant: Ford Global Technologies, LLC, Dearborn, MI (US)

(72) Inventor: Charles Everett Badger, II, Westland, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 0 days.

(21) Appl. No.: 15/250,250

(22) Filed: Aug. 29, 2016

(51) Int. Cl.
*B60Q 1/00* (2006.01)
*B60Q 9/00* (2006.01)
*B60W 50/16* (2012.01)
*B60W 50/14* (2012.01)

(52) U.S. Cl.
CPC .............. *B60Q 9/008* (2013.01); *B60W 50/16* (2013.01); *B60W 2050/143* (2013.01); *B60W 2550/308* (2013.01)

(58) Field of Classification Search
CPC ........ B60Q 9/008; B60Q 5/006; B60Q 1/525; B60Q 1/442; B60Q 2300/116; B60Q 2300/45; B60Q 9/006; B60W 50/16; B60W 2050/143; B60W 2550/308; B60W 50/14; B60W 2050/146; B60W 2750/308; B60W 40/09; B60W 30/165; B60W 2540/30; B60W 2040/0872; G08G 1/16; G08G 9/02; G08G 1/0962; G08B 21/02; G08B 21/06; G08B 21/18; G08B 21/24; B60K 37/02; B60K 2350/2013; B60K 28/02; G06K 9/00845; G06K 9/00805; B60R 1/04; B60R 2300/8093; A61B 5/4809; A61B 5/4812

USPC ............. 340/435, 436, 438, 457, 439; 701/1
See application file for complete search history.

(56) References Cited

U.S. PATENT DOCUMENTS

| | | | |
|---|---|---|---|
| 6,927,694 B1 | 8/2005 | Smith et al. | |
| 7,363,135 B2 | 4/2008 | Lin et al. | |
| 7,676,324 B2 | 3/2010 | Bae | |
| 8,554,410 B2 | 10/2013 | Stahlin et al. | |
| 8,996,246 B2 | 3/2015 | Kim | |
| 9,041,789 B2 | 5/2015 | Schamp | |
| 9,165,463 B2 | 10/2015 | Paek et al. | |
| 9,318,020 B2* | 4/2016 | Salomonsson | G08G 1/096725 |
| 2007/0280505 A1* | 12/2007 | Breed | B60W 40/08 382/104 |
| 2012/0268262 A1* | 10/2012 | Popovic | B60Q 9/008 340/438 |
| 2012/0271484 A1* | 10/2012 | Feit | B60W 30/09 701/1 |
| 2013/0116888 A1* | 5/2013 | Kim | B60W 50/16 701/36 |

* cited by examiner

*Primary Examiner* — Anh V La
(74) *Attorney, Agent, or Firm* — James P. Muraff; Neal, Gerber & Eisenberg LLP

(57) ABSTRACT

Apparatus and methods are disclosed for a stopped vehicle traffic resumption alert. An example disclosed vehicle includes a collision detection unit and a traffic monitor. The example collision detection unit detects an object in front of the vehicle. The example traffic monitor, when a transmission of the vehicle is in drive and a speed of the vehicle is zero, tracks a gaze of a driver with a camera. Additionally, in response to detecting the object transition from being stationary to moving, and the gaze of the driver not being forward, the traffic monitor provides an alert to the driver.

15 Claims, 5 Drawing Sheets

STOPPED VEHICLE TRAFFIC RESUMPTION ALERT

TECHNICAL FIELD

The present disclosure generally relates to systems and methods to assist drivers when driving in traffic and, more specifically, a stopped vehicle traffic resumption alert system.

BACKGROUND

Many people use the stopped time at a traffic light or in stop-and-go traffic to, for example, check data screens or check a mobile device. Thus, they divert their attention elsewhere until traffic moves again. This behavior becomes frustrating for other motorists that are paying attention to a changing traffic light and waiting for the driver in the vehicle in front of them to realize the light has changed and they should be driving. In addition to adding stress to other drivers, this can be dangerous for the stopped driver. If they do not resume driving fast enough, a following driver may honk their horn at them. This tends to startle the inattentive driver. Out of reflex, the inattentive driver may release the brake and accelerate more aggressively than normal to close the gap between themselves and the vehicle in front of them.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

Example embodiments are disclosed for a stopped vehicle traffic resumption alert. An example disclosed vehicle includes a collision detection unit and a traffic monitor. The example collision detection unit detects an object in front of the vehicle. The example traffic monitor, when a transmission of the vehicle is in drive and a speed of the vehicle is zero, tracks a gaze of a driver with a camera. Additionally, in response to detecting the object transition from being stationary to moving, and the gaze of the driver not being forward, the traffic monitor provides an alert to the driver.

An example method to alert a driver comprising includes detecting an object in front of the vehicle. The example method also includes, when a transmission of the vehicle is in drive and a speed of the vehicle is zero, tracking, with a camera, a gaze of the driver. Additionally, the example method includes, in response to detecting the object transition from being stationary to moving, and the gaze of the driver not being forward, providing the alert to the driver.

A tangible computer readable medium comprises instructions that, when executed, cause a vehicle to detect an object in front of the vehicle. Additionally, the instructions cause the vehicle to, when a transmission of the vehicle is in drive and a speed of the vehicle is zero, track, with a camera, a gaze of a driver. The instructions cause the vehicle to, in response to detecting the object transition from being stationary to moving, and the gaze of the driver not being forward, provide an alert to the driver.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
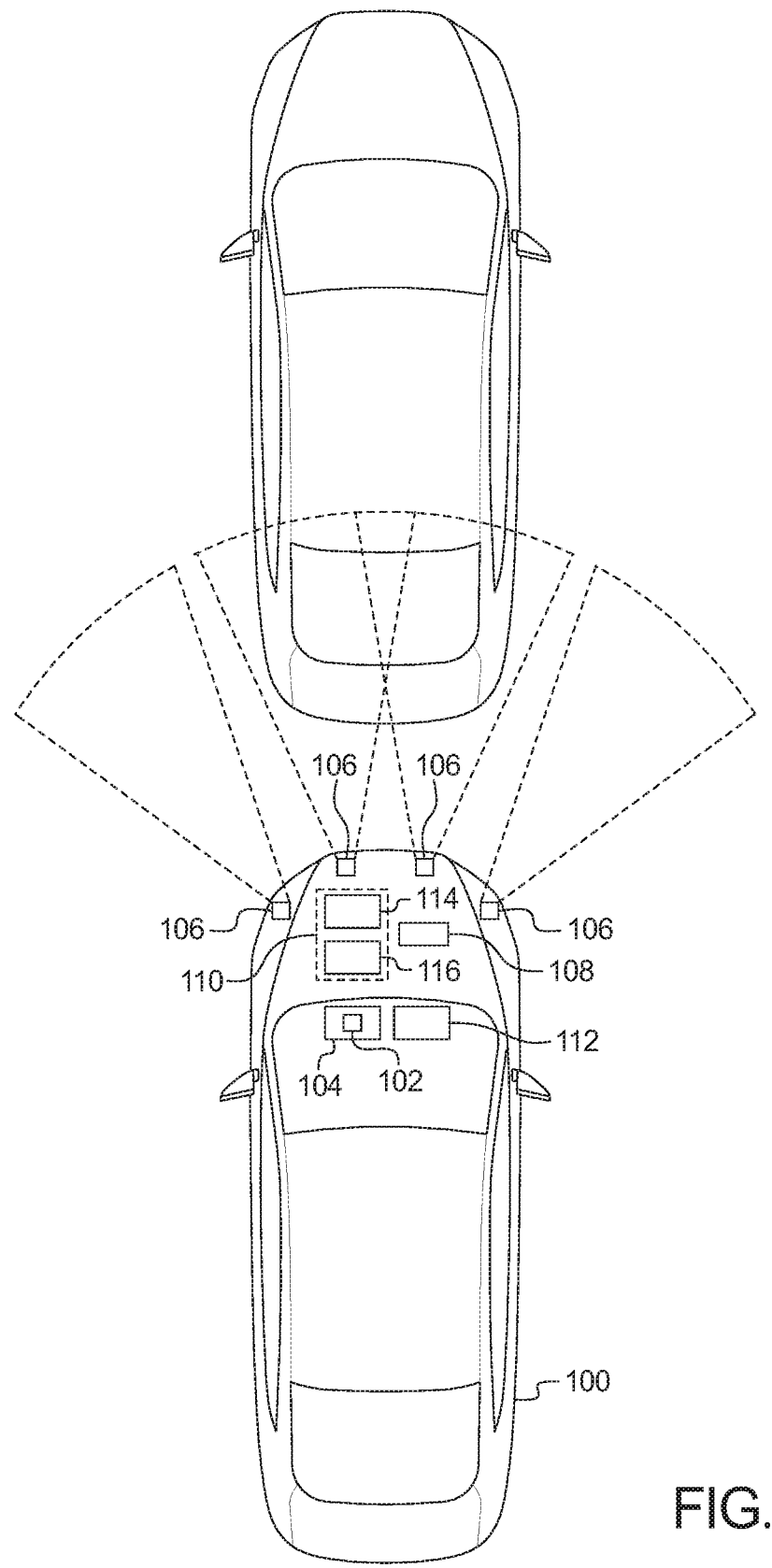
FIG. 1 illustrates a vehicle with a traffic resumption alert system operating in accordance with the teachings of this disclosure.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

While stopped at a traffic signal or in stop-and-go traffic, a driver may get distracted by looking at a mobile device or adjust vehicle settings (e.g., temperature and/or blower speed settings, radio settings, sound system settings, etc.), especially if the driver anticipates that the wait will be for a relatively extended period of time. As disclosed below, an example vehicle includes traffic monitor to determine when to provide an alert to the driver. The vehicle includes a gaze tracker to track the gaze of a driver of the vehicle. Based on the gaze of the driver, the gaze tracker determines whether the driver is looking at the road (e.g., ahead of the vehicle). Additionally, the vehicle includes a collision detection unit that uses range detection sensors (e.g., ultrasonic systems, RADAR, LiDAR, camera(s), and/or infrared sensors) to detect relative positions of nearby vehicles. When traffic in front of the vehicle moves forward and the gaze of the driver is not ahead, the traffic monitor provides an audio, visual and/or haptic alert to the driver. For example, the traffic monitor may vibrate the driver's seat, the steering wheel, and/or one or more of the pedals. In such a manner, the vehicle provides a notification so that the driver returns their attention to the road.

FIG. 1 illustrates a vehicle 100 with a traffic resumption alert system operating in accordance with the teachings of this disclosure. The vehicle 100 (e.g., a car, a truck, a van, a motorcycle, etc.) may be a standard gasoline powered vehicle, a hybrid vehicle, an electric vehicle, a fuel cell vehicle, and/or any other mobility implement type of vehicle. The vehicle 100 includes parts related to mobility, such as a powertrain with an engine, a transmission, a suspension, a driveshaft, and/or wheels, etc. The vehicle 100 may be non-autonomous, semi-autonomous (e.g., some routine motive functions controlled by the vehicle 100), or autonomous (e.g., motive functions are controlled by the vehicle 100 without direct driver input). In the illustrated example the vehicle 100 includes a camera 102, a gaze tracker 104, range detection sensors 106, a speed sensor 108, electronic control units (ECUs) 110, and a traffic monitor 112.

The camera 102 is positioned to track a face of a driver. In some examples, the camera 102 is located in a rear-view mirror (e.g., the rear view mirror 202 of FIGS. 2A and 2B below). Alternatively, in some examples, the camera is located on the dashboard (e.g., proximate a center console display). The camera 102 captures images in the visible light spectrum. In some examples, the camera 102 is a multi-spectral camera that includes multiple lenses and/or filters to capture light in multiple spectral ranges. In some such examples, the camera 102 includes lenses and/or filters to capture light in the visible spectrum and/or the infrared spectrum. Additionally, in some such examples, the camera 102 includes infrared producing light emitting diodes (LEDs) (not shown) to provide a source of infrared light. In such examples, the gaze tracker 104 is able to track the gaze of the driver at night and/or when the driver is wearing sunglasses.

The gaze tracker 104 is communicatively coupled to the camera 102. The gaze tracker 104 indicates when the driver is looking forward and when the driver is not looking forward based on feature points detected on the face of the driver. The feature points define locations on the face of the driver that are indicative of what direction the driver is looking. For example, the gaze tracker 104 may detect the boundaries of the eyes, the location of the pupils, the location of the tip of the nose, and/or the boundaries of the mouth. As disclosed in FIGS. 2A and 2B below, the gaze tracker 104 determines the direction that the driver is looking based on the relationship of the feature points. In some examples, the gaze tracker 104 captures a reference image of the driver looking forward as part of a set up of the vehicle 100 or a profile of the driver. In such examples, the gaze tracker 104 associates the reference image with a profile of the driver. Alternatively, in some examples, the gaze tracker 104 determines references for the feature points while the driver is driving the vehicle 100. For example, the gaze tracker 104 may assume the driver is looking forward when the vehicle is in forward motion over a threshold speed (e.g., twenty miles per hour).

The range detection sensors 106 detect objects in front of the vehicle 100. Additionally, the range detection sensors 106 detect motion of the objects. The range detection sensors 106 include ultrasonic sensors, RADAR, LiDAR, infrared sensors, and/or one or more cameras, etc. The speed sensor 108 measures the speed of the vehicle 100. In some examples, the speed sensor 108 is a wheel speed sensor that measures the rotation of one of the wheels of the vehicle 100. Alternatively, the speed sensor 108 measures the rotation of a crankshaft of the vehicle 100.

The ECUs 110 monitor and control the subsystems of the vehicle 100. The ECUs 110 communicate and exchange information via a vehicle data bus (e.g., the vehicle data bus 306 of FIG. 3 below). Additionally, the ECUs 110 may communicate properties (such as, status of the ECU 110, sensor readings, control state, error and diagnostic codes, etc.) to and/or receive requests from other ECUs 110. Some vehicles 100 may have seventy or more ECUs 110 located in various locations around the vehicle 100 communicatively coupled by the vehicle data bus. The ECUs 110 are discrete sets of electronics that include their own circuit(s) (such as integrated circuits, microprocessors, memory, storage, etc.) and firmware, sensors, actuators, and/or mounting hardware. In the illustrated example, the ECUs 110 include a transmission control unit 114 and a collision detection unit 116. The transmission control unit 114 monitors and controls the transmission of the vehicle 100. The transmission control unit 114 shifts the vehicle 100 into different gears based on information from the other ECUs 110 when the transmission control stick (not shown) is in a driver setting. Additionally, the transmission control unit 114 informs the other ECUs 110 of a current gear ratio (e.g., first gear, second gear, etc.) and/or a current setting (e.g., park, drive, reverse, etc.) of the transmission. The collision detection unit 116 uses the range detection sensors 106 to detect objects (e.g., vehicles, pedestrians, etc.) in front of the vehicle 100 and the motion of the objects. The collision detection unit 116 may, for example, in response to detecting an object, pre-charge brakes and provide an audio and/or visual warning to the driver. In the illustrated examples, the collision detection unit 116 provides information about detected objects to the other components (e.g., the traffic monitor 112, etc.) on the vehicle data bus.

The traffic monitor 112 provides an audio, visual, and/or haptic alert to the occupants of the vehicle 100 when (a) the transmission of the vehicle 100 is in drive, (b) the vehicle 100 is stopped, (c) an object (e.g., another vehicle) in front of the vehicle 100 transitions from being stopped to moving, and (d) the gaze of the driver is not forward towards the road. In some examples, the traffic monitor 112 monitors the acceleration and/or speed of the detected object. In such examples, the traffic monitor 112 determines that the object in front of the vehicle 100 transitions from being stopped to moving when the speed or acceleration of the object satisfies (e.g., is greater than or equal to) a movement threshold. For example, the movement threshold may be five miles per hour. Alternatively or additionally, in some examples, the traffic monitor 112 determines the object is moving when the object moves a threshold distance away from the vehicle 100. For example, when the object is slowly (e.g., does not satisfy the movement threshold) moving forward, the traffic monitor 112 may determine that the object is moving when it is five feet farther away from the vehicle 100. In some such examples, the threshold distance is calibrated based on the frequency of providing the alert. For example, when threshold distance is five feet and the traffic monitor 112 provides the alert after each consecutive stop of the vehicle 100 (e.g., signifying stop-and-go traffic, etc.), the traffic monitor 112 may increase the threshold distance by a foot. The traffic monitor 112 is communicatively coupled (e.g., via the vehicle data bus(es)) to the gaze tracker 104, the speed sensor 108, the transmission control unit 114, and the collision detection unit 116. In the illustrated example, the traffic monitor 112 receives (i) whether the driver is looking forward or not from the gaze tracker 104, (ii) the speed of the vehicle from the speed sensor 108, (iii) the setting of the transmission from the transmission control unit 114, and (iv) whether an object in front of the vehicle 100 is starts to move from a stop from the collision detection unit 116.

Figure 2A:
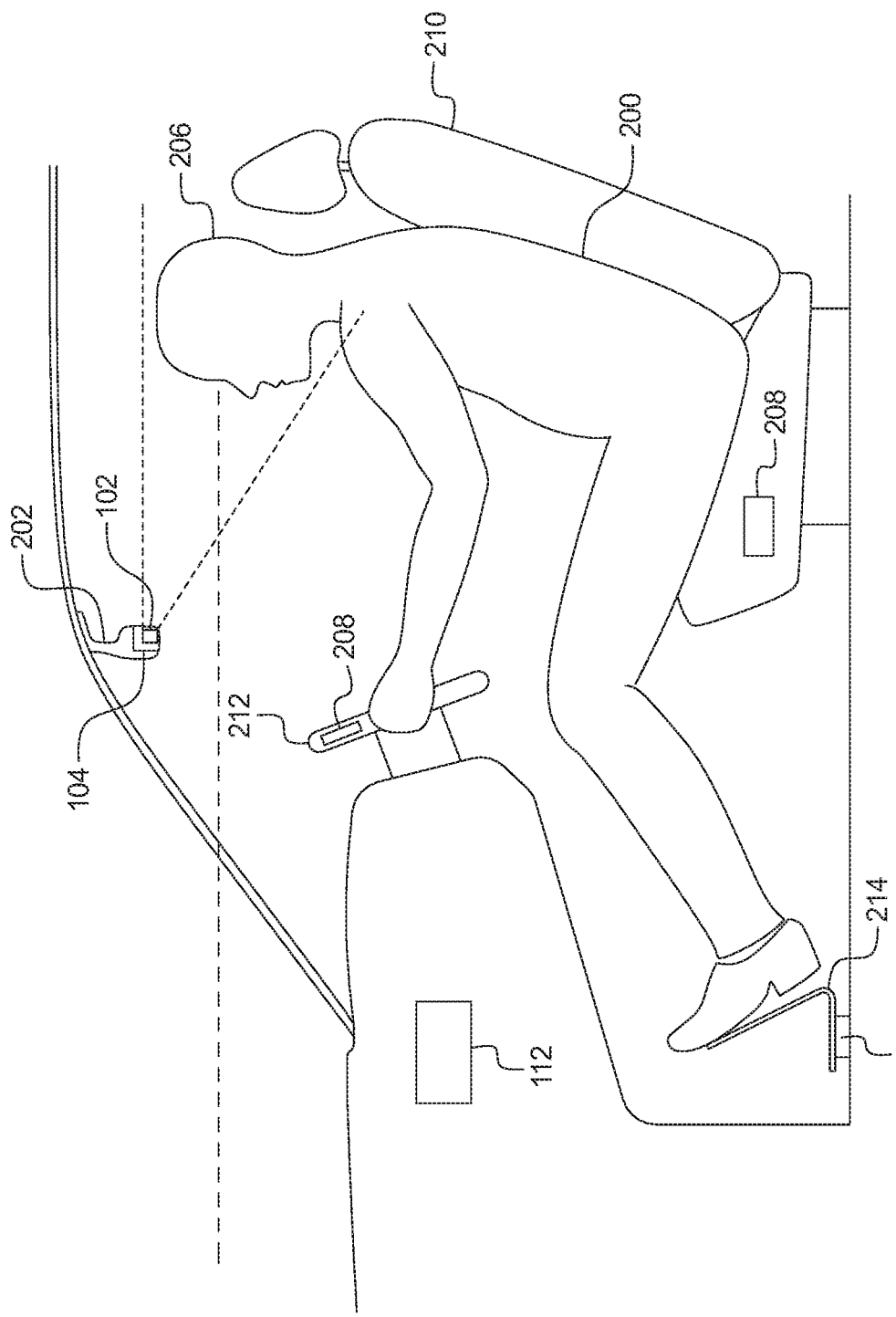
FIGS. 2A and 2B illustrate a driver of the vehicle of FIG. 1.
Figure 2B:
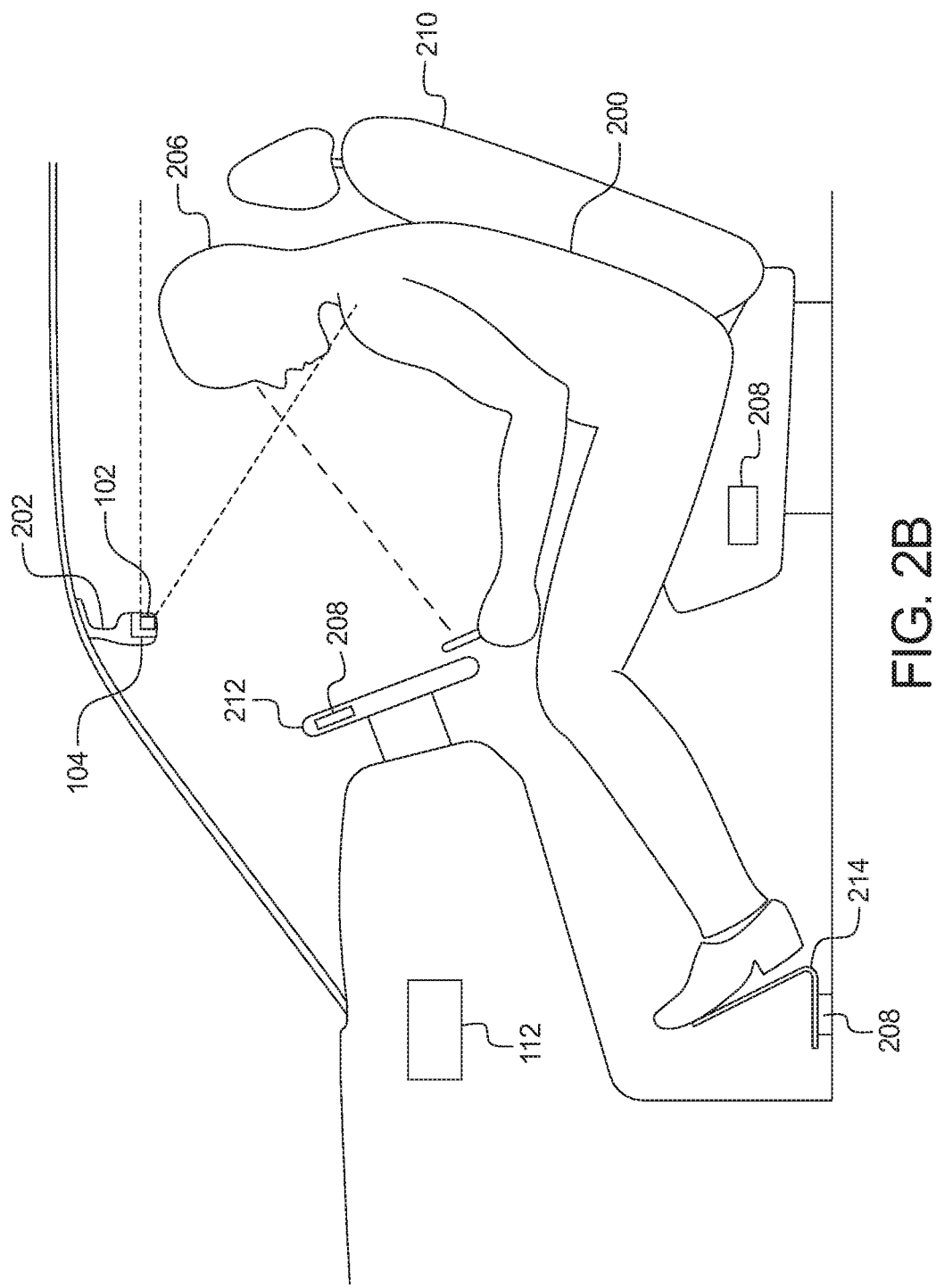

FIGS. 2A and 2B illustrate a driver 200 of the vehicle 100 of FIG. 1. FIG. 2A illustrates the driver 200 looking forward toward the road. FIG. 2B illustrates the driver 200 looking down away from the road. In the illustrated examples, the gaze tracker 104 is embedded or attached to a rear view mirror assembly 202. The gaze tracker 104 monitors the interior of the vehicle 100 so that the head 206 of the driver 200 is within the field of view of the camera 102. The gaze tracker 104, using facial recognition algorithms, determines feature points indicative of the boundaries of the eyes, the location of the pupils, the location of the nose, and/or the boundaries of the lips of the driver 200. Based on the feature points, the gaze tracker 104 determines an angle of the head 206 of the driver 200 and/or vectors that describe the direction that the eyes (sometimes referred to as "eye vectors") are looking in relation to the head 206. For example, the head 206 may be angled such that the gaze of the driver 200 is directed towards the road, and the vectors of the eyes may be downward. In such an example, the gaze tracker 104 indicates that the driver 200 is not looking forward.

In some examples, the gaze tracker 104 monitors the angle of the head 206 and/or the eye vectors to establish a baseline for when the driver 200 is looking forward. In some such examples, the gaze tracker 104 generates the baseline when the vehicle 100 is moving forward above a certain speed. For example, the gaze tracker 104 may generate the baseline when the vehicle 100 is traveling about twenty miles per hour. In such examples, the baseline may include a multiple angle of the head 206 and/or the eye vectors that the gaze tracker 104 considers to be looking forward. Alternatively, or additionally, in some examples, the gaze tracker 104, during a setup process, records the angle of the head 206 and/or the eye vectors of the driver 200 when looking forward to establish the baseline, and associates the baseline with a profile of the driver 200.

In the illustrated examples of FIGS. 2A and 2B, the vehicle 100 includes haptic feedback devices 208. The haptic feedback devices 208 vibrate to alert the driver 200. In the illustrated example, the haptic feedback devices 208 are located in a driver's seat 210, in a steering wheel 212, and on a pedal 214 (e.g., a brake pedal) of the vehicle 100. The haptic feedback devices 208 may be in other locations to provide vibration to the driver 200. The haptic feedback devices 208 may include an unbalanced weight on a motor to provide vibrations. The haptic feedback devices 208 are communicatively coupled to the traffic monitor 112.

Figure 3:
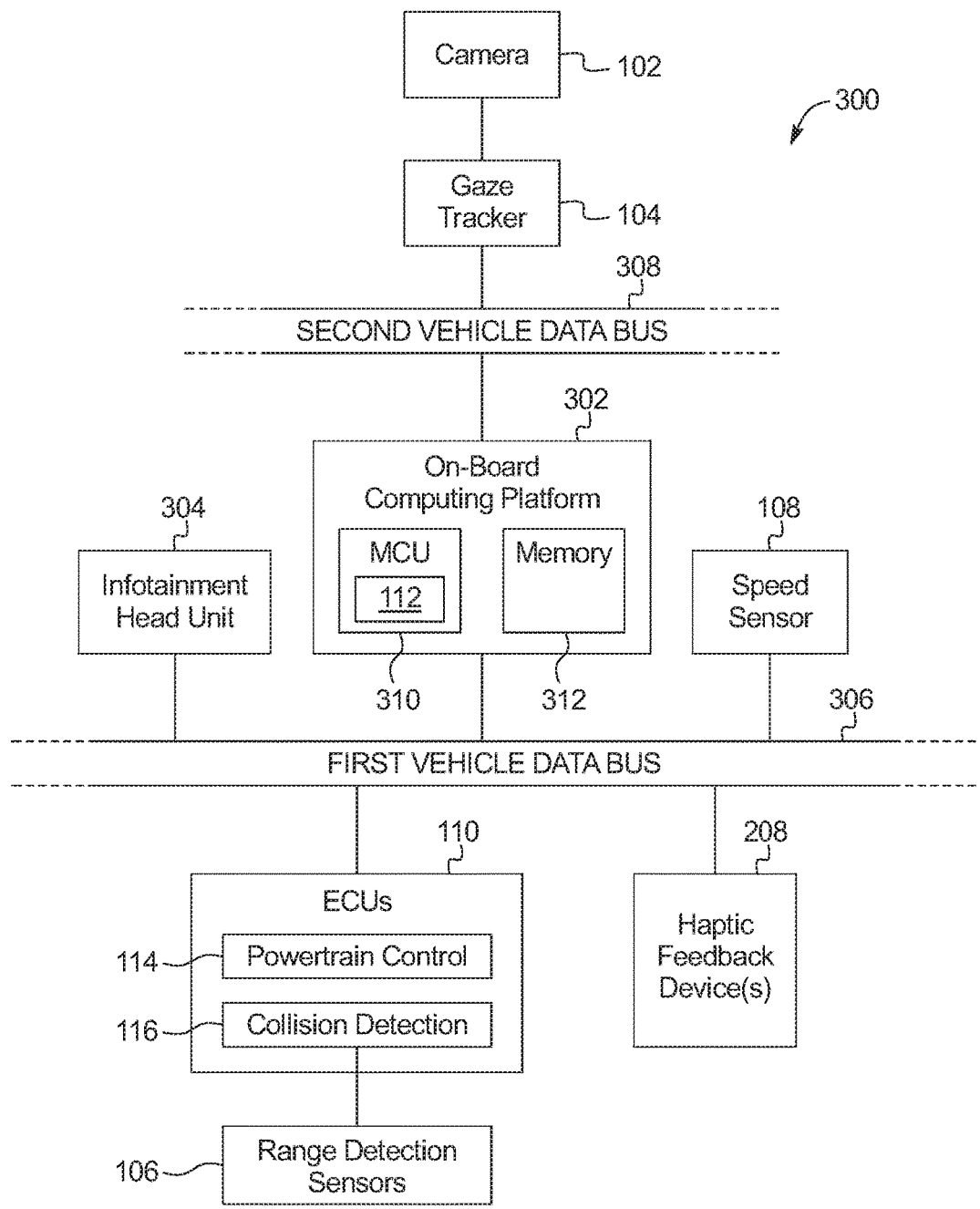
FIG. 3 is a block diagram of electronic components of the vehicle of FIG. 1.

FIG. 3 is a block diagram of electronic components 300 of the vehicle 100 of FIG. 1. In the illustrated example, the electronic components 300 includes the camera 102, the gaze tracker 104, the range detection sensors 106, the speed sensor 108, the ECUs 110, the haptic feedback devices 208, an on-board computing platform 302, an infotainment head unit 304, a first vehicle data bus 306, and a second vehicle data bus 308.

The on-board computing platform 302 includes a processor or controller 310, and memory 312. The processor or controller 310 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). In the illustrated example, the processor or controller 310 is structured to include the traffic monitor 112. Alternatively, in some examples, the traffic monitor 112 may be a separate ECU 110, or part of a different ECU 110, such as the collision detection unit 116. The memory 312 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, memristor-based non-volatile solid-state memory, etc.), unalterable memory (e.g., EPROMs), read-only memory, and/or high-capacity storage devices (e.g., hard drives, solid state drives, etc). In some examples, the memory 312 includes multiple kinds of memory, particularly volatile memory and non-volatile memory.

The memory 312 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 312, the computer readable medium, and/or within the processor 310 during execution of the instructions.

The terms "non-transitory computer-readable medium" and "computer-readable medium" should be understood to include a single medium or multiple media, such as a centralized or distributed database, and/or associated caches and servers that store one or more sets of instructions. The terms "non-transitory computer-readable medium" and "computer-readable medium" also include any tangible medium that is capable of storing, encoding or carrying a set of instructions for execution by a processor or that cause a system to perform any one or more of the methods or operations disclosed herein. As used herein, the term "computer readable medium" is expressly defined to include any type of computer readable storage device and/or storage disk and to exclude propagating signals.

The infotainment head unit 304 provides an interface between the vehicle 100 and a user (e.g., the driver 200, etc.). The infotainment head unit 304 includes digital and/or analog interfaces (e.g., input devices and output devices) to receive input from the user(s) and display information. The input devices may include, for example, a control knob, an instrument panel, a digital camera for image capture and/or visual command recognition, a touch screen, an audio input device (e.g., cabin microphone), buttons, or a touchpad. The output devices may include instrument cluster outputs (e.g., dials, lighting devices), actuators, a heads-up display, a center console display (e.g., a liquid crystal display ("LCD"), an organic light emitting diode ("OLED") display, a flat panel display, a solid state display, etc.), and/or speakers. In the illustrated example, the infotainment head unit 304 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 304 displays the infotainment system on, for example, the center console display. The traffic monitor 112 provides audio and/or visual alerts via the infotainment head unit 304. For example, the traffic monitor 112 may provide a visual alert via the dashboard display and/or the infotainment system.

The first vehicle data bus 306 communicatively couples the speed sensor 108, the ECUs 110, the haptic feedback devices 208, the on-board computing platform 302, the infotainment head unit 304, and other devices connected to the first vehicle data bus 306. In some examples, the first vehicle data bus 306 is implemented in accordance with the controller area network (CAN) bus protocol as defined by International Standards Organization (ISO) 11898-1. Alternatively, in some examples, the first vehicle data bus 306 may be a Media Oriented Systems Transport (MOST) bus, or a CAN flexible data (CAN-FD) bus (ISO 11898-7). The second vehicle data bus 308 communicatively couples the on-board computing platform 302, and gaze tracker 104. The second vehicle data bus 308 may be a MOST bus, a CAN-FD bus, or an Ethernet bus. In some examples, the on-board computing platform 302 communicatively isolates the first vehicle data bus 306 and the second vehicle data bus 308 (e.g., via firewalls, message brokers, etc.). Alternatively, in some examples, the first vehicle data bus 306 and the second vehicle data bus 308 are the same data bus.

Figure 4:
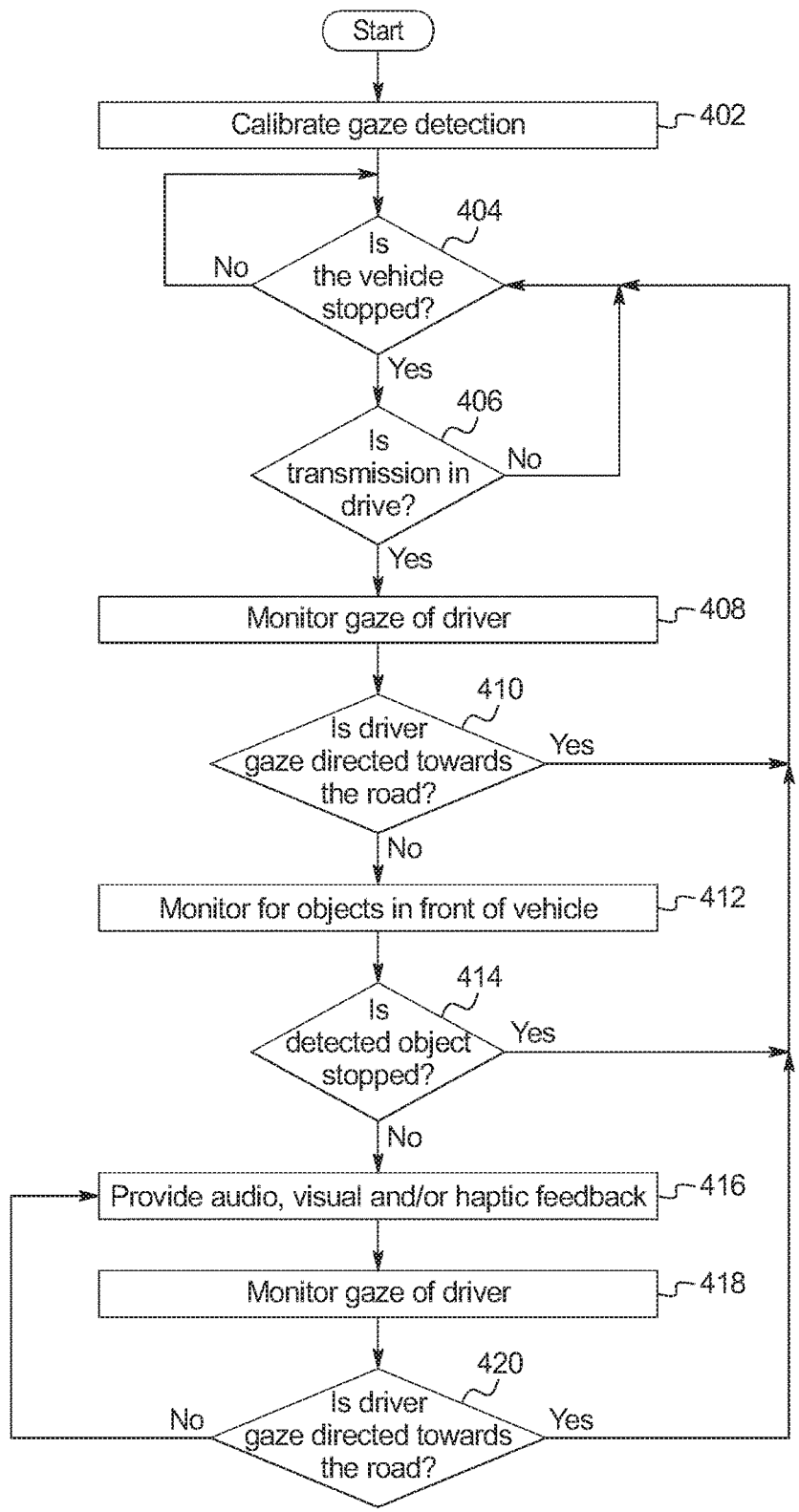
FIG. 4 is a flowchart of a method to alert a driver upon resumption of stopped traffic, which may be implemented with the electronic components of FIG. 3.

FIG. 4 is a flowchart of a method to alert the driver 200 upon resumption of stopped traffic, which may be implemented with the electronic components 300 of FIG. 3. The method of FIG. 4 more being, for example, when an ignition switch of the vehicle 100 is set to an on position. Initially, at block 402, the traffic monitor 112, via the gaze tracker 104, calibrates gaze detection. In some examples, to calibrate gaze detection, the gaze tracker 104 establishes a baseline for the head angle and/or eye vectors of the driver 200. At block 404, the traffic monitor 112 waits until the vehicle 100 is stopped. At block 406, the traffic monitor 112 determines whether the transmission of the vehicle 100 is in drive. If the transmission of the vehicle 100 is in drive, the method continues at block 408. Otherwise, if the transmission of the vehicle 100 is not in drive, the method returns to block 404.

At block 408, the traffic monitor 112, via the gaze tracker 104, monitors the gaze of the driver 200. At block 410, the traffic monitor 112, via the gaze tracker 104, determines whether the driver 200 is looking towards the road. If the driver 200 is looking towards the road, the method returns to block 404. Otherwise, if the driver is not looking towards the road, the method continues to block 412. At block 412, the traffic monitor 112, via the collision detection unit 116, monitors for objects (e.g., another vehicle, etc.) in front of the vehicle 100. At block 414, the traffic monitor 112 determines whether an object detected at block 412 is stopped. If the object is stopped, the method returns to block 404. Otherwise, if the method is not stopped, the method continues at block 416. At block 416, the traffic monitor 112 provides an audio, visual and/or haptic response to the driver 200. In some examples, the traffic monitor 112 provides the audio and/or visual response via the infotainment head unit 304, and/or the haptic response via the haptic feedback devices 208. For example, the traffic monitor 112 may vibrate the driver's seat 210. At block 418, the traffic monitor 112, via the gaze tracker 104, monitors the gaze of the driver 200. At block 420, the traffic monitor 112, via the gaze tracker 104, determines whether the driver 200 is looking towards the road. If the driver 200 is looking towards the road, the method returns to block 404. Otherwise, if the driver is not looking towards the road, the method returns to block 416.

The flowchart of FIG. 4 is representative of machine readable instructions that comprise one or more programs that, when executed by a processor (such as the processor 310 of FIG. 3), cause the vehicle 100 to implement the example traffic monitor 112 of FIGS. 1 and 2A, 2B. Further, although the example program(s) is/are described with reference to the flowchart illustrated in FIG. 4, many other methods of implementing the example traffic monitor 112 may alternatively be used. For example, the order of execution of the blocks may be changed, and/or some of the blocks described may be changed, eliminated, or combined.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   a collision detection unit to detect an object in front of the vehicle; and
   a traffic monitor to:
      when a transmission of the vehicle is in drive and a speed of the vehicle is zero, track, with a camera, a gaze of a driver; and
      in response to detecting the object transition from being stationary to moving, and the gaze of the driver not being forward, provide an alert to the driver.

2. The vehicle of claim 1, wherein the traffic monitor is to:
   monitor the speed of the object; and
      determine that the object transitions from being stationary to moving when the speed of the object satisfies a speed threshold.

3. The vehicle of claim 1, wherein the traffic monitor is to, when the speed of the vehicle satisfies a speed threshold, create a baseline of a face of the driver to detect when the driver is not looking forward.

4. The vehicle of claim 1, wherein the camera is a multispectral camera.

5. The vehicle of claim 4, wherein the camera includes lenses and filters an infrared spectrum.

6. The vehicle of claim 1, wherein the alert is at least one of a sound, a visual indicator, or a haptic response.

7. The vehicle of claim 1, wherein the alert vibrates at least one of a seat, a pedal, or a steering wheel.

8. A method to alert a driver in a vehicle comprising:
   detecting, with range detection sensors, an object in front of the vehicle;
   monitoring, with a transmission control unit, a state of a transmission;
   when the transmission of the vehicle is in drive and a speed of the vehicle is zero, tracking, with a driver-facing camera, a gaze of the driver; and
   in response to detecting the object transition from being stationary to moving, and the gaze of the driver not being forward, providing an alert to the driver.

9. The method of claim 8, including:
   monitoring the speed of the object; and
      determining that the object transitions from being stationary to moving when the speed of the object satisfies a speed threshold.

10. The method of claim 8, including, when the speed of the vehicle satisfies a speed threshold, creating a baseline of a face of the driver to detect when the driver is not looking forward.

11. The method of claim 8, wherein the camera is a multispectral camera.

12. The method of claim 11, wherein the camera includes lenses and filters an infrared spectrum.

13. The method of claim 8, wherein the alert is at least one of a sound, a visual indicator, or a haptic response.

14. The method of claim 8, wherein the alert vibrates at least one of a seat, a pedal, or a steering wheel.

15. A tangible computer readable medium comprising instructions that, when executed, cause a vehicle to:

detect an object in front of the vehicle;
when a transmission of the vehicle is in drive and a speed of the vehicle is zero, track, with a camera, a gaze of a driver; and
in response to detecting the object transition from being stationary to moving, and the gaze of the driver not being forward, provide an alert to the driver.

\* \* \* \* \*